(12) United States Patent
Paone, III

(10) Patent No.: US 7,842,265 B1
(45) Date of Patent: Nov. 30, 2010

(54) MERCURY ABSORPTION SYSTEM FOR INDUSTRIAL KILN APPLICATIONS

(75) Inventor: Peter T. Paone, III, Catasauqua, PA (US)

(73) Assignee: FLSmidth A/S, Valby (DK)

( * ) Notice: Subject to any disclaimer, the term of this patent is extended or adjusted under 35 U.S.C. 154(b) by 0 days.

(21) Appl. No.: 12/483,426

(22) Filed: Jun. 12, 2009

(51) Int. Cl.
*B01D 53/34* (2006.01)
*B01D 53/64* (2006.01)
*B01D 53/74* (2006.01)

(52) U.S. Cl. ............... 423/210; 423/242.1; 423/244.01; 423/245.1; 423/215.5; 423/DIG. 5; 422/168; 422/169; 422/170; 422/171; 422/172; 422/187; 422/105; 422/108; 422/111

(58) Field of Classification Search ................. 423/210, 423/242.1, 244.01, 145.1, 215.5, DIG. 5, 423/245.1; 422/168–172, 177, 187, 105, 422/108, 111

See application file for complete search history.

(56) References Cited

U.S. PATENT DOCUMENTS 5,169,611 A * 12/1992 Kupper et al. ............... 423/210
6,582,497 B1 * 6/2003 Maes et al. ................... 95/134

* cited by examiner

*Primary Examiner*—Timothy C Vanoy
(74) *Attorney, Agent, or Firm*—Daniel DeJoseph; Aaron M. Pile

(57) ABSTRACT

Disclosed is a method for the reduction of mercury emissions from an industrial plant utilizing a cement or minerals kiln that has a high level of mercury. The invention allows for the repeated treatment of a gas stream to reduce the level of mercury and other pollutants through reduction steps, allowing targeted treatment of specific compounds. The invention utilizes multiple sorbent injections for the step-wise reduction in pollutants. Utilizing the multiple stages of reaction, very high levels of mercury emissions may be controlled to greater reduction percentages than existing methods.

21 Claims, 3 Drawing Sheets

MERCURY ABSORPTION SYSTEM FOR INDUSTRIAL KILN APPLICATIONS

BACKGROUND OF THE INVENTION

There is an increasing level of awareness concerning the emission of mercury and other volatile metals such as cadmium and thallium, certain volatile organic compounds (VOCs), acid gases such as HCl, and dioxin/furans from industrial plants such as cement manufacturing facilities. With this heightened level of awareness, more stringent environmental regulations are being adopted to lower emissions from these industrial plants. Consequently, there is an interest in developing systems for controlling emissions to meet newly proposed regulations, and that is an object of the present invention.

BRIEF DESCRIPTION OF THE INVENTION

This invention is a method of reducing emissions of mercury and other contaminants from mineral processing systems such as cement or mineral kiln systems.

The invention comprises a method and system for the reduction of mercury emissions from an industrial plant utilizing a cement or lime kiln that has a high level of mercury emissions. The exhaust gas stream from the cement plant is first treated to make it more adaptable to mercury capture. Mercury is then captured in multiple stages to achieve a high degree of capture.

Exhaust gases from the industrial plant are first subject to preliminary deducting and are then treated by cooling the gases to at least near the condensation temperature of certain mercury compounds and other contaminants.

The gases are then passed through multiple steps including the injection of a sorbent, absorption of mercury compounds onto the sorbent, and collection of the sorbent. The sorbent may be recycled through the invention several times before becoming saturated, and then may be disposed of or treated for further mercury removal. The multiple stages of injection, absorption, and collection also allow for the independent usage of several types of sorbent in different stages of the device in order to target selective removal of compounds. It should be understood that when a sorbent is employed mercury and other contaminants may absorb at temperatures slightly above—that is, up to about 25° above—their condensation temperature.

This invention is not limited to cement plants. It can be used on any industrial processing plant where the emission of volatile metals, VOC's, or dioxin/furans are require a very high degree of treatment for attainment of regulatory requirements, for example long dry cement kilns, and lime kilns.

DESCRIPTION OF THE INVENTION

Figure 1:
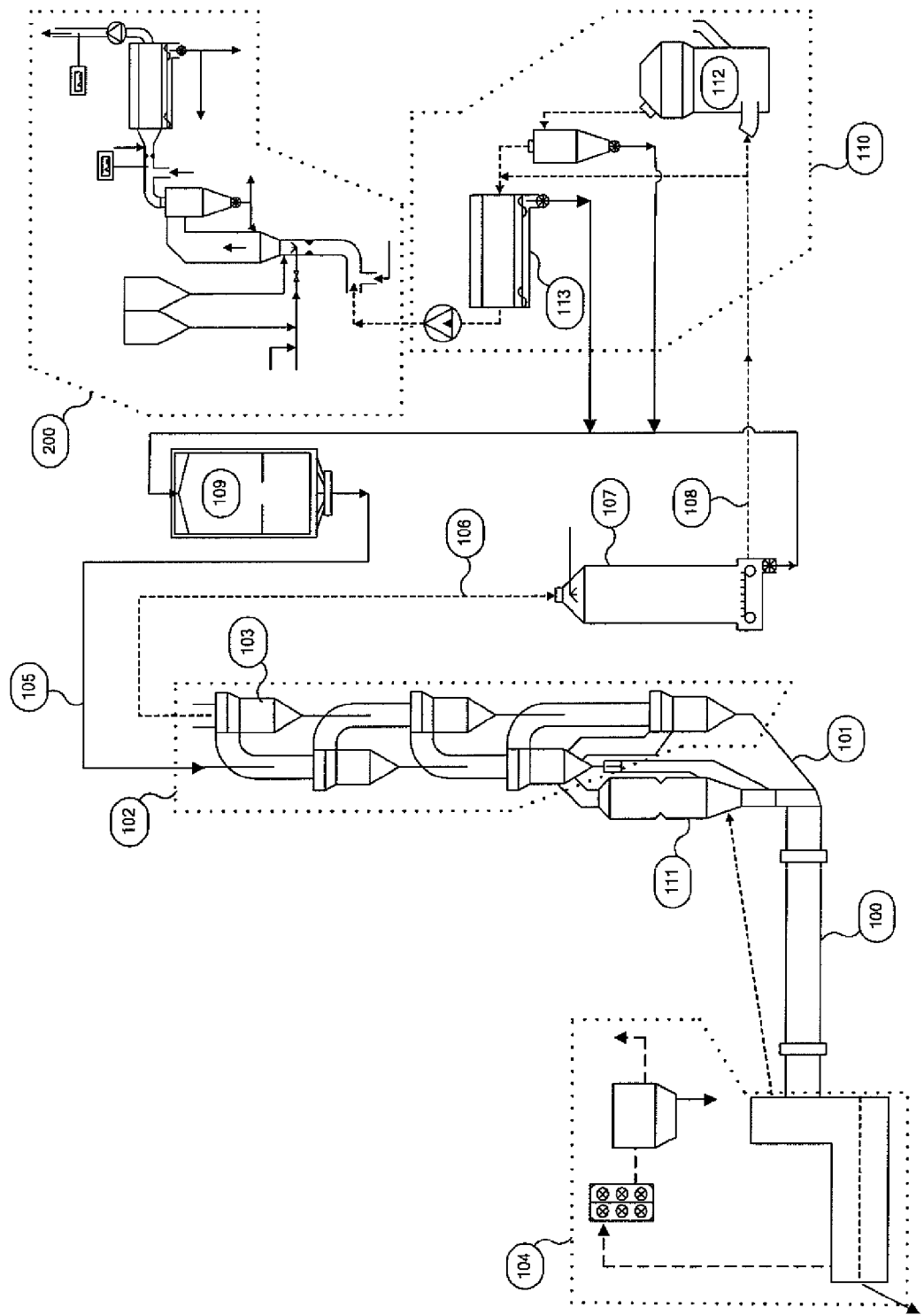
FIG. 1 is a general diagram of a plant for the production of cement clinker adapted to the cleaning of mercury and other contaminants according to the invention.

Although the invention is particularly directed to the removal of mercury it should be understood that the present invention also applies to the removal of other contaminants including volatile metals such as cadmium and thallium, sulfur compounds, condensable volatile organic compounds (VOC's), acid gases such as HCl, and dioxin/furans from industrial plants such as cement manufacturing facilities that contaminate manufacturing processes. Also, while emphasis is placed on a cement manufacturing process, it is understood that the present invention is applicable to other kiln manufacturing processes, such as lime manufacturing processes and other industrial processes where very high starting emission levels of the above compounds can not be sufficiently controlled using existing methods.

Mercury typically enters an industrial process, such as a cement kiln process, in raw materials and fuels. In cement processes the mercury enters in very low concentrations. Due to the phase properties of mercury and mercury compounds, very little mercury exits with the cement clinker product; nearly all of the mercury entering the process will leave the system through gases and dust exiting from the kiln system. Phase properties of mercury compounds can also create cycles of mercury in the system, leading to periods of accumulation and storage of mercury followed by periods when mercury is purged from the system. The emissions levels seen during some periods in time can far exceed the fresh input of mercury into the system as the accumulated mercury leaves the system. For plants that have a high baseline input of mercury, the release of a large amount of mercury in a short amount of time can overwhelm existing technology for the control of mercury, and can cause emissions level to exceed permissible levels established by environmental regulation. The method and system of the present invention provides a high level of mercury removal.

In the present invention, exhaust gas containing mercury compounds from a kiln system, whether it comprises a wet or long-dry kiln, a kiln with a preheater, or a kiln with a precalciner, enter the system after first going through a dedusting procedure, such as by passing the gases through an air pollution control device comprising, for example, a baghouse, an electrostatic precipitator, a gravel bed filter, or any device utilized to capture dust lost from the kiln or milling system to maintain the operation of the plant essentially in compliance with dust emission limits. Gases from multiple locations in the plant may also be treated in accordance with the present invention.

After being subject to an initial dedusting procedure, these gases are then directed through a cooling means for the gases such as, most preferably, a gas suspension absorber (GSA), a gas cooling tower or fluidized bed. In that regard, it should be noted that when reference is specifically made herein to a GSA as the cooling means it is understood that a gas cooling tower or fluidized bed can also satisfy the requirements of the invention. A gas suspension absorber consists of a tubular reaction vessel through which these gases are directed maintaining a residence time preferentially between 0.5 and 3.0 seconds.

A supply of water is provided to the cooling means in order to cool the gases to at least near the condensation temperature of elemental mercury and optionally a number of other contaminant chemical species. By "at least near" it is meant to cool to at least 25° C. above the condensation temperature and below for adsorption to initiate. Therefore, if a particular contaminant has a condensation temperature of 100° C., it should be cooled to about 125° C. and below.

In the case of mercury, as it has a high vapor pressure at temperatures even below its condensation temperature a significant amount of mercury will be in the vapor phase even at its condensation temperature. Therefore, it is most preferred to cool mercury to temperatures significantly below its condensation temperature. Therefore, the temperature at the exit of the cooling means is controlled to maintain a high absorption of mercury between about 40° C. to about 200° C., more preferably about 70° C. to about 160° C. and most preferably about 90° C. to about 135° C. The amount of water supplied is used to control the exit temperature from the reaction vessel to maintain this temperature. The water sprayed into the vessel may use mechanical atomization or air atomization to ensure evaporation of the water.

A sorbent comprising, for example, hydrated lime, recycled cement kiln dust, activated carbon, or a specialized sorbent formulated for the capture of one or more specific compounds, may be added with the water as a slurry or may be supplied separately through direct dry injection to the vessel to assist in the absorption of the pollutants. The amount of sorbent to utilize will depend on many factors and will be assessed by the practitioner on a case to case basis. Factors to consider will include the concentration of contaminants, particularly mercury, in the process gas, the process gas flow rate, the efficiency of the sorbent, the price of the sorbent, to name a few. As just a general guideline, which can be modified for any of the factors set forth above, activated carbon is generally at a rate between about 3 and about 5 lbs of sorbent per one million cubic feet of process gas (lb/MMACF), and hydrated lime between about 12 and about 20 lb/MMACF. The type of sorbent employed will also depend on factors such as the nature of the contaminates in the gas stream that may also interfere with attacking the target pollutant. For example, if there is SO2, oxidized mercury and elemental mercury in the gas stream lime may be the sorbent of choice to first attack the SO2 and oxidized mercury after which activated carbon may be used to attack elemental mercury.

Chemical additives such as oxidizing agents may be optionally added, either upstream, downstream, or in the reaction area, to assist in converting the mercury to the oxidized form to aid in the readsorption of mercury when the sorbent or chemical reagent is added downstream of the first dust collector. Suitable oxidizing agents include ozone, peroxide, halogenated species such as a chlorine solution such as calcium chloride, potassium permanganate, hydrochloric acid, iodine and other agents suitable to oxidize mercury. Alternatively, subjecting the gas stream to UV light can serve to convert some of the mercury to an oxidized form.

The preferred amount of oxidizing agent will typically be expressed as its concentration in the gas stream downstream from where the agent is injected. For example, when the oxidizing agent is chlorine the preferred concentration of chlorine in the gas stream will generally range from about 50 to about 100 ppm. The addition of such oxidizing agents can be reduced or eliminated, particularly when there are naturally occurring oxidizing agents such as chlorine and other halogens in the hot process gas from the preheater, which may be the case depending on the raw materials utilized in the process, the type and form of the oxidizing agent to be used, the amount of volatized mercury in the preheater gas and whether any oxidizing agents occur naturally in the preheater gas. The practitioner of the invention should take into consideration the emission of un-reacted oxidizing agents such as HCl, ozone, or chlorine when determining levels of injection to be utilized, as these compounds may be subject to governmental emissions controls.

Gases exiting the gas suspension absorber are passed through a separation/collection vessel. The separation/collection vessel is preferentially a cyclone or a series of cyclones, but may also be a drop-out chamber. The separation/collection vessel removes a high percentage of the sorbent passing through the gas suspension absorber which has absorbed a large fraction of the mercury in the gas stream. This dust may be recycled back to the gas suspension absorber to capture additional mercury until saturated, and/or may be taken to other areas of the plant for inclusion into the finished product from the plant, addition to grinding mills, added to the kiln feed bin or blending silo for introduction to the kiln system, use as a fire suppressant in process equipment such as coal mills and disc reactors, treatment of the dust in a mercury removal system, or disposal. It is preferred to recycle a portion of this dust back to the GSA to reduce or eliminate the requirement of sorbent for capture of mercury in the reaction vessel. The dust should not be sent to the kiln feed bin or blending silo for introduction to the kiln system, as this will only increase the circulation of mercury in the system and will not appreciably assist in reduction of overall emissions levels.

In practice, if additional through put capacity is desired, alternatively multiple gas suspension absorbers with cyclones in parallel may be utilized instead of a single large gas suspension absorber with multiple cyclones. The former is preferred in locations where multiple pieces of equipment utilize the same main air pollution control device, with such multiple pieces of equipment operating independently of each other (eg. two or more kilns using the same main baghouse). In these instances, gas flow rates may differ drastically with the number of pieces of equipment providing exhaust gas, making maintenance of the required residence time in a single GSA difficult for all operating scenarios.

Depending on the starting level of mercury compounds in the gas stream, it may be necessary to place multiple gas suspension absorbers with cyclones in series in order to provide separate absorption and separation stages between various compounds of mercury and/or competing pollutants. For example, in locations where sulfur dioxide may be present in appreciable quantities in the gas stream, sulfur dioxide may compete with mercury compounds for adsorption sites on the sorbent utilized in the invention, and therefore it may be preferred to utilize a first GSA for collection of sulfur dioxide, followed by a second GSA for the collection of mercury compounds. It should be noted that the use of multiple GSA's will result in increased power requirements for the system. It is preferred in such situations to recycle gases back to the inlet of the second GSA for additional capture of mercury.

The gases exiting from the separation/collection device(s) following the gas suspension absorber(s) are then treated with the injection of a second amount of sorbent. The sorbent in this additional sorbent injection step is not required to be of the same composition as the sorbent injected in the previous sorbent injection step, i.e. the GSA stage of the invention. The use of a different type of sorbent may be preferred if other components in the gas stream interfered with the adsorption of specific mercury compounds in the first stage of absorption.

Control of the sorbent injection rate in the second sorbent injection step may be maintained by utilizing either a ratio of sorbent to gas flow through the system or through continuous emission analysis of the gas stream prior to injection and/or at the exhaust of the system. The gases are then passed to a second air pollution control device for the capture of the sorbent and any additional entrained dust prior to release of the gases to the atmosphere.

An additional "bleed air" damper may be located in the ductwork prior to the inlet to the gas suspension absorber and/or in the ductwork between the GSA collection device and the second air pollution control device in order to improve the temperature profile seen in the second air pollution control device, to provide control for the temperature in the second air pollution control device during conditions when gas flows do not allow the use of water for gas cooling (such as during start-up of the cement kiln system), or to provide a means of reducing the dewpoint of the gas stream to avoid the condensation of moisture and acids on the interior surfaces of the air pollution control device and associated ductwork. Gases may be drafted through the second air pollution control device by means of an induced draft fan following the air pollution control device, by an induced draft fan between the gas suspension absorber and the second air pollution control device, or by a combination of such methods.

The material collected in the second air pollution control device may be recycled back to the gas suspension absorber and/or to the ductwork between the gas suspension absorber and the second air pollution control device to capture additional mercury until saturated, and/or may be taken to other areas of the plant for inclusion into the finished product from the plant, addition to grinding mills, addition to the kiln feed bin or blending silo for introduction to the kiln system, use as a fire suppressant in process equipment such as coal mills and disc reactors, treatment of the dust in a mercury removal system, or disposal. Returning this dust to the kiln feed bin or blending silo for introduction to the kiln system will increase the circulation of mercury in the system and will not appreciably assist in reduction of overall emissions levels.

It is preferred to recycle a portion of the recovered sorbent to the injection point prior to the air pollution control device to reduce the requirement of fresh sorbent for capture of mercury. In practice, the use of an air pollution control device which can provide a product with differential material size gradation (such as an electrostatic precipitator for sorbent capture) will also allow for the return of a coarse fraction of the dust product to one location (such as a waste stream) and the fine fraction of the dust product captured to a separate location (such as to the gas suspension absorber inlet). The dust captured in the air pollution control device may also be separated between a fine and coarse fraction using other technologies (for example a static or dynamic separator) and then returned to separate locations.

The invention is explained in greater detail below with the aid of the drawings.

In the system of the present invention as illustrated in FIG. 1, material is treated in a kiln 100 which heats the material to undergo chemical changes. In cement kiln systems, the feed entering kiln 100 through conduit 101 may be first preheated in a preheater system 102 comprising a number of counter-current heat exchangers 103 in the form of cyclones. The material may also be passed through a calciner or pre-calciner 111 for removal of carbon dioxide from the material prior to entering kiln 100. The product from the kiln may be cooled in a cooling system 104 provided for the recovery of heat to the process and for the removal of excessive waste heat for handling of the product. Gases exiting from kiln 100 are directed through precalciner 111 and into preheater system 102 and thereafter may be directed via conduit 106 to an optional conditioning tower 107 for cooling before being used in other processes. Milling and dust collection system 110 is used for the preparation of raw materials for the plant through grinding and for the collection of grinding product and kiln dust. Gases from the preheater system 102 are directed to raw material grinding mill 112 via conduit 108 for drying and conveying raw materials. The prepared raw materials are stored in a silo 109 and thereafter are fed to the kiln system. The gases leaving the raw material grinding mill 112 as well as gases from preheater system 102 are dedusted in an air pollution control device 113 and are passed through area 200 for removal of contaminants.

Figure 2:
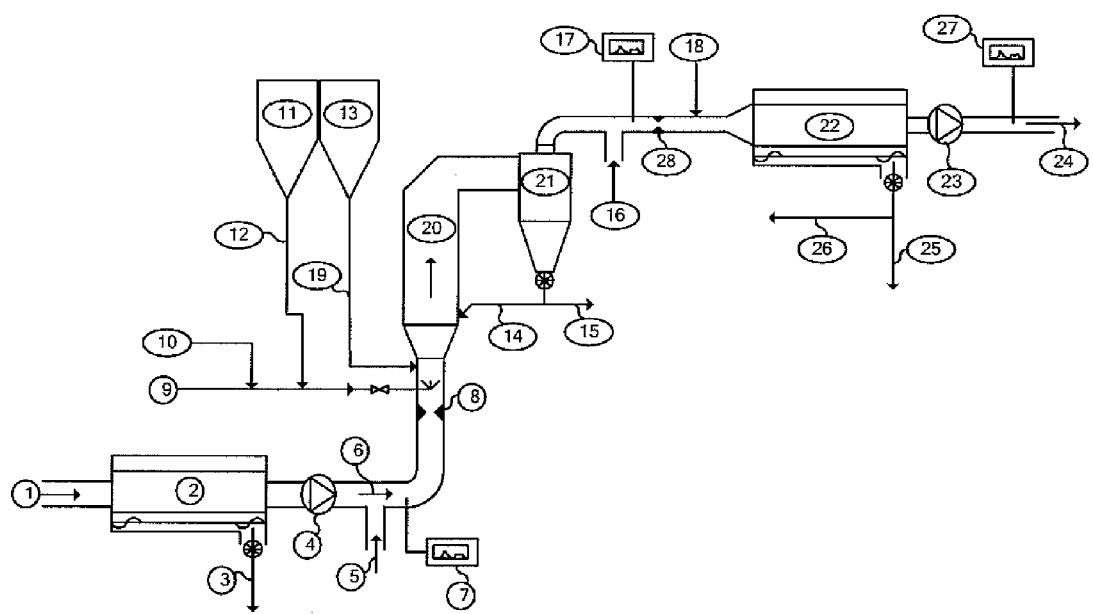
FIG. 2 is a diagram of one embodiment of the method and system of the invention utilizing two stages of injection and absorption in a location after the main air pollution control device of a cement plant.

FIG. 2 shows one embodiment of the system and method of the present invention using a kiln installation for the production of cement clinker, with emphasis on area 200 of FIG. 1. Process gases containing entrained exit dust such as, and preferably, from the exit of a kiln, preheater or precalciner system are directed via conduit 1 to a first air pollution control device 2 where the entrained dust is removed from the gas stream and is removed through dust exit line 3. These gases that are being treated may be passed directly from the kiln, preheater, or precalciner exit or may be treated in an intermediate step with water or air for temperature control, or may optionally be first passed through a milling system or a waste heat recovery system prior to being treated in the system of the present invention. The gases are pulled through the first air pollution control device by means of an induced draft fan 4. Alternatively, the gases may be pushed through the air pollution control device by placing a fan prior to the device. Optionally, substantially dedusted gases from other equipment at the plant such as exhaust gases from other kilns at the site, kiln bypass gases, or exhaust gases from mill systems, are combined via conduit 5 with the dedusted gases exiting first air pollution control device 2 via conduit 6.

A supply of water 9 may be sprayed into the gas entering the invention and atomized through a mechanical means or by the addition of atomization air 10. A slurry and/or treatment solution storage vessel 11 may be used to supply a slurry or treatment solution through conduit 12 into the supply line for the cooling water or through a separate supply line. The slurry may comprise a combination of water and limestone, lime, hydrated lime, cement kiln dust (CKD), activated carbon, or a specialized sorbent for the collection of mercury.

The treatment solution may comprise a liquid or gaseous form of ozone, peroxide, halogenated species such as chlorine including calcium chloride, potassium permanganate, hydrochloric acid, bromine, iodine and other agents suitable to oxidize mercury.

It is preferred that slurry solution and/or treatment solution are atomized in order to ensure proper capture of mercury compounds on the sorbent utilized. In the depicted embodiment the slurry solution and/or treatment solution are sprayed into the conveying line relatively close to the entrance to cooling means 20. In another embodiment the slurry solution and/or treatment solution may be sprayed into the conduit containing the gases in a location sufficiently upstream of the cooling means 20 to provide additional residence time for the oxidation of mercury for easier capture of the mercury—for example, the solution may be inserted into the system prior to first air pollution control device 2.

A storage vessel 13 may be used to provide a dry sorbent 19, comprising hydrated lime, recycled cement kiln dust (CKD), kiln gas bypass dust, main air pollution control device capture, activated carbon, and/or a specialized sorbent, which may be added by direct injection to the gas stream to assist in collecting the mercury in the gas stream. The gas stream and sorbent enter a cooling means, such as a GSA comprising a tubular reaction vessel 20 for a typical residence time of between about 0.5 and about 3.0 seconds. The temperature at the exit of the vessel is controlled to maintain a high absorption and condensation of mercury onto the sorbent, generally between about 40° C. to about 200° C., more preferably about 70° C. to about 160° C. and most preferably 90° C. to about 135° C.

The water 9 supplied prior to the inlet of the cooling means is used to control the exit temperature from the reaction vessel to maintain this temperature. A flow measuring device 8 located in the proximity of the gas inlet end of the cooling means may also be used to assist in calculating water spray requirements and/or sorbent concentration based on gas volume as a feed-forward control. An emissions sampling device and analyzer 7 for mercury compounds, or for other emissions which are meant to be controlled, may be placed in the circuit of the present invention for monitoring the emissions levels at the inlet of the GSA, and may also be used as a feed-forward controls to assist in sorbent injection rates based on the gas volume entering the cooling means. The same or additional analyzers may be used to monitor mercury levels at exit of the GSA, and/or the exit of a second air pollution control device 22.

The gases and sorbent exiting the cooling means 20 are vented to a separation/collection device 21, preferably a cyclone or set of cyclones, from which the coarser fraction of the entrained dust is collected. A portion of the collected sorbent may be returned to the GSA 20 via conduit 14 to absorb a greater amount of mercury and to assist in maintaining a steady outlet temperature from the GSA. Any remaining portion of the sorbent collected may be withdrawn via conduit 15 and wasted to reduce levels of contaminants, utilized in other areas of the plant for fire suppression in equipment such as coal grinding mills and disc reactors, added to the product grinding mill, added to the product silos, used as a contaminant sorbent, or taken to a device for the removal of harmful contaminants. The collected sorbent on which mercury is adsorbed should not be utilized in the storage and/or blending silo, a kiln feed bin, or a kiln dust bin, as such use will re-introduce the contaminants into the process.

Exhaust gases from the collection cyclone may be further cooled with the addition of ambient air via conduit 16 to assist in maintaining the water dewpoint temperature below the temperature of the gas stream in order to avoid the condensation of moisture on the ducting or in the second air pollution control device 22. The ambient air may be added from, for example, an ambient air damper (not shown) that may also be used for the protection of the second air pollution control device 22 (which may be a baghouse) during start-up conditions of the kiln system when gas flows may be insufficient to provide protection through alternative means of gas cooling (such as water sprays).

Exhaust gases from the collection cyclones are optionally treated with the second addition of a sorbent 18, consisting of hydrated lime, recycled cement kiln dust, kiln gas bypass dust, air pollution control device capture, activated carbon, or a specialized sorbent, which may optionally be added to the gas stream prior to the second air pollution control device 22 to assist in collecting additional mercury in the gas stream. The sorbent utilized in this location may be a different type than utilized in the cooling means. For example, a sorbent may be utilized at this location that is designed to specifically capture a mercury compound that may not have been captured in cooling means 20.

A flow measuring device 28 may also be installed prior to the second sorbent injection location 18 to assist in calculating sorbent injection rates based on gas volume as feed-forward controls. A second emissions sampling device and analyzer 17 for mercury compounds, or for other emissions which are meant to be controlled, may be placed prior to the second air pollution control device 22 for monitoring of the emissions levels entering the air pollution control device, and may also be used to assist in sorbent injection rates prior to the second air pollution control device 22 based on gas volume as feed-forward controls, or may be used as a feed-back control for the injection of sorbent for use in the cooling means 20.

The gas stream and sorbent are drafted through the second air pollution control device 22 by means of a fan 23 prior to venting to the atmosphere via conduit 24 or being sent to additional air pollution control devices. It is preferred that the second sorbent injection be at a location that will provide for between about 0.1 and about 3.0 seconds of retention time for absorption to occur in the gas stream before the sorbent enters the second air pollution control device. The dust captured in the air pollution control device 22 may be removed via exit conduit 25 and subsequently wasted to reduce levels of contaminants, utilized in other areas of the plant for fire suppression in equipment such as coal grinding mills and disc reactors, added to the product grinding mill, added to the product silos, used as a contaminant sorbent, or taken to a device for the removal of harmful contaminants. If the air pollution control device is of a type which provides a segregation of material fineness a separate fraction of the product dust may be withdrawn via conduit 26 for use according to the needs of the practitioner of the invention. If the air pollution control device does not provide a segregation of material fineness between areas of the second air pollution control device 22 (such as a baghouse) a fraction of the dust removed may still be removed via conduit 26 and separated from the main product removed via conduit 25, but a significant difference in chemical composition and material fineness would not be expected between the fractions.

A further emissions sampling device and analyzer 27 for mercury compounds, or for other emissions which are meant to be controlled, may be placed downstream of the second air pollution control device 22 in the circuit for monitoring of the emissions levels of exiting gases, and may also be used as a feed-back control for the injection of sorbent 18 used prior to the air pollution control device.

Figure 3:
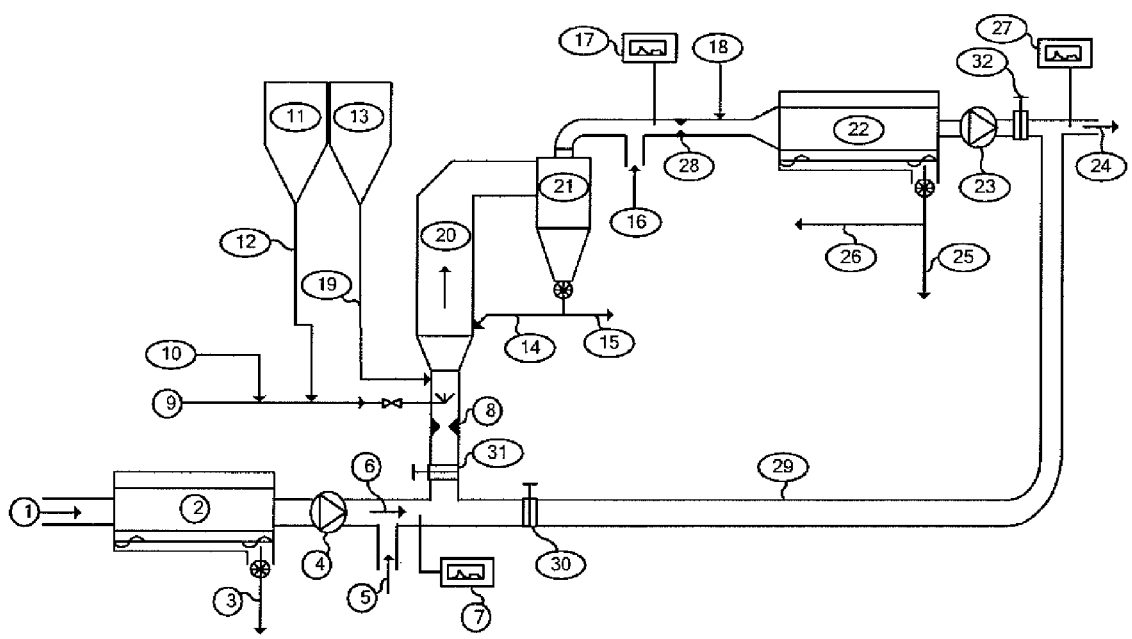
FIG. 3 is a diagram of another embodiment of the method and system of the invention utilizing two stages of injection and absorption in a location after the main air pollution control device of a cement plant, with a duct installed for the bypass of gases around the invention or the recycle of gases back to the inlet of the invention for additional treatment of the gases.

FIG. 3 shows a second embodiment of the application of the method according to the invention using a kiln installation for the production of cement clinker, with the addition of a gas duct 29. The gas duct is supplied for the bypass of exhaust gases from the first air pollution control device 2 to atmosphere and can be installed to provide for a path for gas to flow in the event that emission of mercury or other pollutants from the industrial plant are below regulatory levels and the invention may be stopped, or for instances where maintenance on the invention may be performed. To prevent gas from flowing through this duct during normal operation, an isolation damper 30 may be provided to stop gas from passing through this bypass. Further isolation dampers 31 and 32 located, respectively, prior to the inlet to the cooling means 20 and after the second air pollution control device 22 may also be provided to prevent gases from passing through the invention during periods when the invention may be stopped. During normal operation of the present invention, dampers 31 and 32 would remain open, while damper 30 would be closed. During periods when bypass of air is required, dampers 31 and 32 would be closed, while damper 30 would be opened. As an alternate, a regulating damper can be supplied in addition to or in place of an isolation damper 30 to provide for control of the gas stream. The usage of a regulation damper would allow for the recycle of gases from the exit of the second air pollution control device 22 invention back to the inlet of the cooling means for increased capture of mercury and other pollutants.

Using this invention, the exhaust gases from an industrial plant such as a cement kiln can be treated multiple times to remove mercury from the exhaust until the total content of mercury in the gas stream is below levels that may be considered safe for release to the atmosphere. Treatment of the gas stream may also allow for easier removal of other pollutants, or additional treatment downstream.

The invention having been thus described it will be obvious that the same may be varied in many ways without departing from the spirit and scope thereof. All such modifications are intended to be included within the scope of the invention which is defined by the following claims.

What is claimed is:

1. A method for the reduction of contaminant emissions including mercury present in vaporized form from the process gases of an industrial plant utilizing a kiln to heat treat a raw material, said method comprising
   (i) directing plant process gases from the plant to a first air pollution control device having a process gas inlet and exit to dedust the process gases;
   (ii) directing the dedusted process gases from the first air pollution control device to a cooling means having a process gas inlet and outlet wherein the dedusted gases are cooled to near the condensation temperature of the contaminants;
   (iii) absorbing such contaminants on a first amount of sorbent that is entrained in the dedusted process gases;
   (iv) directing the process gases in which the first amount of sorbent with absorbed contaminants is entrained from the cooling means to a separation device wherein said sorbent with absorbed mercury is separated from the process gases;
   (v) contacting the process gases from which the sorbent with absorbed mercury was separated with a second amount of sorbent that entrains in the process gases and absorbs contaminants in the process gases; and
   (vi) directing the process gases in which the second amount of sorbent with absorbed contaminants is entrained to a second air pollution control device having a process gas inlet and exit wherein said sorbent is separated from the off gases.

2. The method of claim 1 wherein the process gases include at least one of kiln off gases, preheater off gases and precalciner off gases.

3. The method of claim 1 wherein the cooling means is a gas suspension absorber.

4. The method of claim 1 wherein the cooling means is a gas cooling tower.

5. The method of claim 1 wherein the cooling means is a fluidized bed.

6. The method of claim 1 wherein process off gases are cooled in the cooling means to a temperature ranging from about 40° C. to about 200° C.

7. The method of claim 6 wherein process off gases include preheater off gases.

8. The method of claim 1 further comprising:
   redirecting the separated sorbent with absorbed mercury realized from at least one of step (iv) or step (vi) back to at least one of the cooling means or the process gas inlet of the second air pollution control device.

9. The method of claim 1 further comprising:
   utilizing a flow measuring device located in the proximity of the gas inlet of the cooling means to assist in calculating either or both of water spray requirements or sorbent concentration based on gas volume as a feed-forward control.

10. The method of claim 1 further comprising:
    utilizing a flow measuring device located in the proximity of process gas inlet of the second air pollution control device to assist in calculating sorbent concentration based on gas volume as a feed-forward control.

11. The method of claim 1 further comprising utilizing at least one emissions sampling device and analyzer for mercury compounds to monitoring the mercury emissions levels at one or more locations consisting of the process gas inlet of the cooling means, the process gas outlet of the cooling means and the process gas exit of a second air pollution control device.

12. The method of claim 1 wherein the industrial plant is a plant for the production of cement clinker.

13. The method of claim 1 further comprising contacting the process gas with an oxidizing agent to assist in converting the mercury in the process gases to the oxidized form.

14. The method of claim 13 wherein the oxidizing agent is UV light.

15. A system for reducing contaminants in the process gases of an industrial plant, said contaminants being condensable and including mercury, comprising,
    a kiln for heat treating comminuted raw material;
    a preheater located, in the direction of material flow, upstream from the kiln for preheating the comminuted raw material with off gases from the kiln;
    a first air pollution control device for dedusting process gases;
    means to direct off gases from one or both of the kiln or preheater to the first air pollution device for dedusting;
    a cooling device for cooling dedusted process gases to a temperature near the condensation temperature of mercury;
    means to direct the dedusted gases from the first air pollution control device to the cooling device;
    means to direct a first sorbent for absorbing the mercury into the cooling device for entrainment in the dedusted gases;
    a separation device located downstream from the cooling device for separating entrained sorbent containing absorbed contaminants from the cooled process gases and means to directing at least a portion of the separated sorbent back to the cooling device.

16. The system of claim 15 wherein the cooling means is a gas suspension absorber.

17. The system of claim 15 wherein the kiln is a cement kiln.

18. The system of claim 15 wherein the first sorbent is in the form of a slurry.

19. The system of claim 15 wherein the first sorbent is in a dry form.

20. The system of claim 15 further comprising a second air pollution control device for dedusting process gases and removing a second sorbent with absorbed contaminants from process gases located downstream from the separation device; means to direct the cooled process gases from the separation device to the second air pollution control device; and means to direct said second sorbent for absorbing the mercury into the cooled gases at a location intermediate the separation device and the second air pollution device.

21. The system of claim 20 further comprising means to direct at least a portion of the sorbent separated in the second air pollution control device at least one of the cooling means or the process gas inlet of the second air pollution control device.

* * * * *